Sept. 28, 1954　　　V. A. GREY　　　2,689,971
SAUSAGE SKINNING MACHINE
Filed March 9, 1953　　　6 Sheets-Sheet 1

INVENTOR.
Victor A. Grey
BY
Cromwell, Greist + Warden
Atty's.

Sept. 28, 1954 V. A. GREY 2,689,971
SAUSAGE SKINNING MACHINE
Filed March 9, 1953 6 Sheets-Sheet 2

INVENTOR.
Victor A. Grey
BY
Cromwell, Greist & Warden
Attys

Sept. 28, 1954 V. A. GREY 2,689,971
SAUSAGE SKINNING MACHINE
Filed March 9, 1953 6 Sheets-Sheet 3

INVENTOR.
Victor A. Grey
BY
Cromwell, Greist & Warden
Attys.

Sept. 28, 1954 V. A. GREY 2,689,971
SAUSAGE SKINNING MACHINE
Filed March 9, 1953 6 Sheets-Sheet 5

INVENTOR.
Victor A. Grey
BY
Cromwell, Greist & Warden
Attys.

Sept. 28, 1954  V. A. GREY  2,689,971
SAUSAGE SKINNING MACHINE
Filed March 9, 1953  6 Sheets-Sheet 6

INVENTOR.
Victor A. Grey
BY
Cromwell, Greist & Warden
Attys.

Patented Sept. 28, 1954

2,689,971

UNITED STATES PATENT OFFICE 2,689,971

SAUSAGE SKINNING MACHINE

Victor A. Grey, Chicago, Ill., assignor to Kartridg-Pak Machine Co., a corporation of Iowa Application March 9, 1953, Serial No. 341,034

20 Claims. (Cl. 17—1)

This invention relates to the manufacture of skinless frankfurters or sausages and is more particularly concerned with improvements in mechanism for removing in a rapid and efficient manner the casing or skin of a plurality of connected sausage links.

In the manufacture of skinless frankfurters or sausages it is the practice to form the sausages by first filling or stuffing with the sausage meat a predetermined length of sausage casing, which casing is formed of cellulose film or similar material. The stuffed casing is then divided into a plurality of individual links of substantially uniform length, generally by twisting or otherwise constricting a small section of the casing between the links. The connected links are processed by cooking and smoking or other treatment necessary to prepare the product for market and the processed links are separated finally by removing the casing. Machines have been provided for mechanically stuffing the casing and for forming the individual sausages preparatory to the processing operations but the final operation of separating the processed sausages is generally performed by hand, which has added materially to the cost of the product. Machines for mechanically removing the casing have been heretofore proposed but they have either not operated satisfactorily to remove the casing or they have been too slow and inefficient.

In copending application Serial No. 189,874 filed October 12, 1950, now Patent No. 2,630,598, issued March 10, 1953, a sausage skinning machine is disclosed which incorporates mechanism capable of removing the casing from successive links of connected sausages in a satisfactory and efficient manner. This mechanism however, does not provide for automatic control of the sausages, but the feeding is under the control of the operator and the speed and efficiency of the mechanism is necessarily dependent on the skill and the attention of the operator.

It is a general object of the present invention to provide an improved mechanism for removing the casing from a string of connected sausage links which, upon the leading sausages in the string being properly started through the machine, operates automatically upon successive sausages to efficiently and rapidly separate the sausages and deliver the same from the casing.

It is another object of the invention to provide mechanism for operating on successive sausages in a connected string thereof to straighten the casing between each sausage and the next succeeding sausage, to loosen the casing around the successive sausages, to slit the casing lengthwise of the sausages and to completely separate the casing from the sausages, together with a device responsive to movements of the sausages which controls the operation of the mechanism whereby each successive sausage is automatically rotated about its axis to straighten the casing between it and the next succeeding sausage, after which it is advanced through the loosening and slitting mechanism and completely separated from the casing.

It is a further object of the invention to provide a machine for removing the casing from a plurality of connected sausage links, which sausages are characterized by being formed with a twisted section of casing separating the individual sausages and with the twisting being in the same direction, wherein a hollow rotatably mounted mechanism is provided having means therein for slitting the casing as the sausages move therethrough, means for inflating the casing to loosen the same in advance of the slitting means, and resilient means for gripping the sausages and guiding them through the same, together with mechanism for gripping the slit casing and for exerting a pull thereon to move the successive sausages through the casing loosening and slitting mechanism, and control mechanism having means engageable with the sausages and responsive to movements thereof to rotate the casing loosening and slitting mechanism and operate the casing pulling mechanism whereby each successive sausage is moved into the casing loosening and slitting mechanism and axially rotated to remove the twist in the casing between it and the next succeeding sausage, and thereafter the casing is advanced by the casing pulling mechanism to move the sausage through the casing loosening and slitting mechanism and to advance the next succeeding sausage into the same for rotation thereby.

It is a still further object of the invention to provide a mechanism for removing the casing from a plurality of connected sausages which comprises a rotatable hollow head, sausage guiding and supporting members in the head for guiding the sausages axially through the same, a plow and slitting device arranged within the head and adapted to engage between the sausages and the casing to partially loosen the casing from the sausages and slit the same longitudinally as the sausages are moved into the head, the plow being provided with a stream of air which inflates the casing in advance of the slitting device, a guideway for directing the successive sausages into the head, a rotatable feeding mechanism for engaging the slit casing beyond the head and exerting a pull thereon to move the sausages therethrough, power mechanism connected to the rotatable head and the rotatable casing pulling mechanism for operating the same, electrical control mechanism for said power mechanism which control mechanism is operative to selectively rotate the head and the casing pulling mechanism and a pair of movably connected actuating fingers which are positioned to engage the sausages as they move into the head, the fingers being movable in response to advancing movement of the sausages and to inflation of the untwisted casing section between each sausage as it moves into the head and the next succeeding sausage, and the control mechanism being responsive to movements of the fingers whereby the head is rotated to remove successive twists in the casing and the casing is pulled to advance the next succeeding sausages into the head.

It is another object of the invention to provide a machine for removing the casing from a plurality of connected link sausages which sausages are characterized by being formed with a twisted section of casing separating the individual sausages and with the twisting being in the same direction, wherein a rotatable head through which the sausages are adapted to pass in an axial direction is provided having therein resilient gripping and guide means for the sausages, a plow and slitting device adapted to engage between the sausages and the casing to partially loosen the casing from the sausages by a stream of air directed through the end of the plow and to slit the same longitudinally as the sausages are moved through the head, a rotatable device mounted beyond the discharge end of the head for engaging the casing and exerting a pull thereon sufficient to move the sausages through the head, and control means adjacent the entrance to the head and responsive to movement of the sausages and inflation of the casing between the same to operate successively the head for removing the twists between the sausages and the casing pulling means for moving successive sausages through the head.

It is another object of the invention to provide a mechanism for removing the casing from a a plurality of connected link sausages, which sausages are characterized by being formed with a twisted section of casing separating the individual links and with the twisting being in the same direction, the mechanism comprising a hollow rotatably mounted head having supporting and guiding members for directing the sausage links therethrough, a plow and slitting device in the head arranged to engage between the sausages and the casing and slit the casing, the plow having a controllable supply of air at the tip adapted to inflate and loosen the casing ahead of the slitting, rotatably mounted elements beyond the head which are operable to engage and exert a pull on the slit casing, a guideway for directing the sausages into the head, a power mechanism and clutch means for selectively connecting the power mechanism with the rotatable head and the rotatable casing pulling elements, a switch controlling the clutch means and also controlling the supply of air to the plow, a pair of yieldable operating fingers connected to the switch, the yieldable fingers being arranged to engage on opposite sides of the sausages as they advance toward the head and being movable towards each other when they engage the twisted sections of the casing between the sausages whereby to cause the power mechanism to rotate the head and remove the twists in the casing and also to cause air to be delivered to the plow to inflate the casing sections when they are untwisted, the fingers being movable away from each other upon inflation of the untwisted casing sections to operate the casing pulling elements and pull the sausages through the head while stopping the rotation of the head, with alternate operation of the head and the casing pulling elements being continued until all the sausages in the string have been untwisted and passed through the head.

It is another object of the invention to provide a mechanism for use in removing the casing from a plurality of connected sausages which are characterized by twists in the casing between the sausages wherein operation of the mechanism, upon initially threading the leading sausages through the same, is completely automatic, with each successive sausage being moved through the mechanism and separated from the casing after it has been rotated to remove the twist between it and the next succeeding sausage and with each sausage being moved into the mechanism and automatically rotated the required amount to straighten the casing connecting the same with the next succeeding sausage regardless of the number of twists in the casing, the last sausage and the trailing end of the casing being automatically carried through the mechanism.

It is another object of the invention to provide a mechanism for use in removing the casing from a string of connected sausages wherein the operation of the mechanism is completely automatic after the leading sausages have been threaded into the mechanism and the power mechanism which drives the same has been started, all of the sausages being automatically moved through the mechanism and operation of the mechanism being automatically stopped upon movement of the last sausage and the trailing end of the casing through the mechanism.

It is another object of the invention to provide in a power driven mechanism for removing the casing from a string of connected sausages, automatic control means for operating the mechanism which includes a cut out for the power drive which is controlled by a casing feeding device whereby the mechanism can be placed in operation only after the leading sausages in the string have been properly threaded into the mechanism and the leading end of the casing is engaged by the casing feeding device.

These and other objects of the invention will be apparent from a consideration of the mechanism which is shown by way of illustration in the accompanying drawings, wherein.

Referring to the drawings there is illustrated a mechanism which embodies the principal features of the invention and which is adapted to remove the casing from a length or string of connected sausage links. The sausages with which the illustrated mechanism is adapted to be used are of the type which are initially formed or linked by dividing a predetermined length of filled sausage casing into links of uniform length and rotating each successive link to impart a twist in the casing between it and the next succeeding link. Such sausages when processed may be readily untwisted by rotating each successive sausage in the opposite direction while the remainder of the string is held or remains in non-rotating relation thereto, the casing being of cellulose which does not adhere to itself in the twisted areas during the processing and which will not rupture under the tension developed during the twisting operation.

Figure 1:
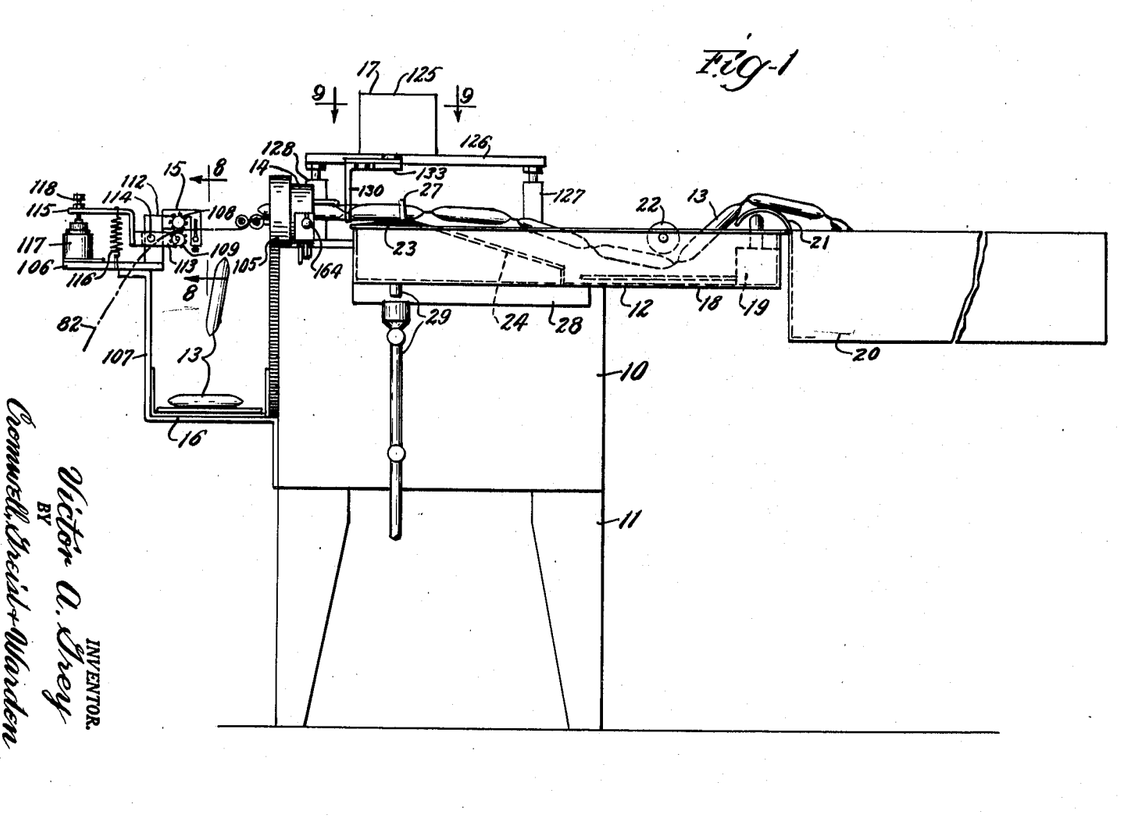
Fig. 1 is a side elevation of mechanism embodying therein the principles of the invention, with portions thereof broken away.

The illustrated mechanism comprises (Figs. 1 and 2) a main supporting frame or cabinet 10 having depending legs 11 and provided along an upper side edge with an elongate sausage supporting structure 12 for receiving a string or length of connected sausages 13 in partially strung-out or extended relation. A sausage skinning device or head 14 is supported on the upper forward corner of the cabinet 10 adjacent the end of the supporting structure 12 with the end thereof in proper alignment therewith to receive the connected sausages 13 as they are moved longitudinally over the supporting feed structure 12. A casing pulling or feeding device 15 is arranged in spaced relation and in proper alignment with the discharge or delivery end of the skinning head 14 for feeding the sausages through the skinning head 14. A delivery conveyor 16 or other collecting device is arranged beneath the skinning head 14 and positioned to receive the individual sausages 13 as they are separated from the casing by the skinning device 14 and delivered from the machine. A control mechanism 17 for automatically controlling the operation of the skinning head 14 and the casing pulling or feeding device 15 is arranged adjacent the supporting structure 12 at the receiving end of the skinning head 14.

The supporting feed structure 12, on which the string of sausages 13 is positioned for delivery to the skinning head 14, comprises a generally rectangular, relatively narrow, open-topped, liquid receiving tank 18 which is provided with a suitable liquid, such as water, which is maintained at a temperature of approximately 115°. Preferably, a self-contained thermostatically controlled electric heater 19 is positioned in the rear end of the tank to maintain the liquid at the proper temperature. A supply container 20 is provided at the rear end of the tank 18 for receiving a substantial number of strings of the sausages 13, the receptacle 20 being provided with a curved flange 21 for guiding and supporting the sausages 13 as a string is fed into the tank 18 and beneath a roller 22 which insures that the sausages are immersed in the liquid as they approach the forward end of the tank 18 where they are directed upwardly towards the receiving end of the head 14 by a guiding and supporting plate member having an upper platform 23 and an upwardly inclined ramp portion 24. The forward end or platform portion 23 of the support plate is provided at the front end thereof with notched side flanges 25 (Fig. 5) and supporting pins 26 are provided in the side walls of the tank 18 for removably mounting the plate in the forward end of the tank 18 with the platform portion 23 substantially horizontal and at the top edge of the tank. A pair of laterally spaced guide members 27 extend upwardly of the platform 23 and serve to guide or direct the individual sausages toward the receiving end of the head 14 in proper alignment with the same. The entire supporting structure 12 is secured to the cabinet 10 by an angle bracket 28 beneath the same. A bottom drain aperture and drain pipe 29 are provided to permit the liquid to be drained from the tank 18 when desired.

The casing removing or skinning head 14 (Figs. 2, 3, 4 and 5) is supported by a bracket plate 30 extending laterally from the top plate of the cabinet 10 adjacent the end of the tank 18. The head 14 comprises an outer member 31 consisting preferably of a hollow tube-like section which is rigidly secured at the bottom, by any conventional fastening means, to the bracket 30, the latter being bolted or otherwise secured to the cabinet 10. The outer head member 31 is arranged with its longitudinal axis parallel to and spaced above the top of the platform member 23 approximately the diameter of the sausages 13. The head member 14 is spaced a predetermined distance forwardly of the end of the tank 18.

The outer head member 31 forms a supporting cage or frame for an inner head member 32 which is received in rotatable relation in the same. The inner head member 32 (Fig. 5) consists of a tube-like section which has a somewhat smaller external diameter than the internal diameter of the outer member 31 and which is separated therefrom and supported for rotation therein by a pair of axially spaced carbon bearing rings 33 of substantial thickness. A pair of metal sealing rings 34, which are of generally L-shaped cross section, are arranged in axially spaced relation between the opposed inner faces of the bearing rings 33 and are urged away from each other toward the faces of the bearing rings 33 by a plurality of peripherally spaced compression springs 35 seated in suitable aligned recesses provided in the opposed inner edges or faces of the rings 34. The sealing rings 34 are arranged with their outer peripheral faces engaging the inner wall of the head member 31 at 36 and with their outer oppositely directed end faces engaging the inner faces of the bearing rings 33 at 37. A pair of rubber O-rings 38 are arranged between the sealing rings 34 and the outer peripheral surface of the inner head member 32, which O-rings are confined in the axial direction by axially spaced rib or shoulder formations 39 extending from the peripheral surface of the member 32 and which hold the sealing rings 34 in spaced relation to the outer peripheral surface of the inner head member 32 and in engagement with the inner surface of the outer head member 31. A channel-like peripheral air space 40 is provided between the spaced O-rings and the opposed inner faces of the sealing rings 34, the latter being held in spaced relation by the springs 35. The air space 40 is connected through an aperture 41 in the external head member 31 and supply pipe 42 with a source of compressed air which will be described subsequently. The inner head member 32 is provided with a radial aperture 43 which is in communication with the air receiving compartment 40.

Figures 5, 6, 7:
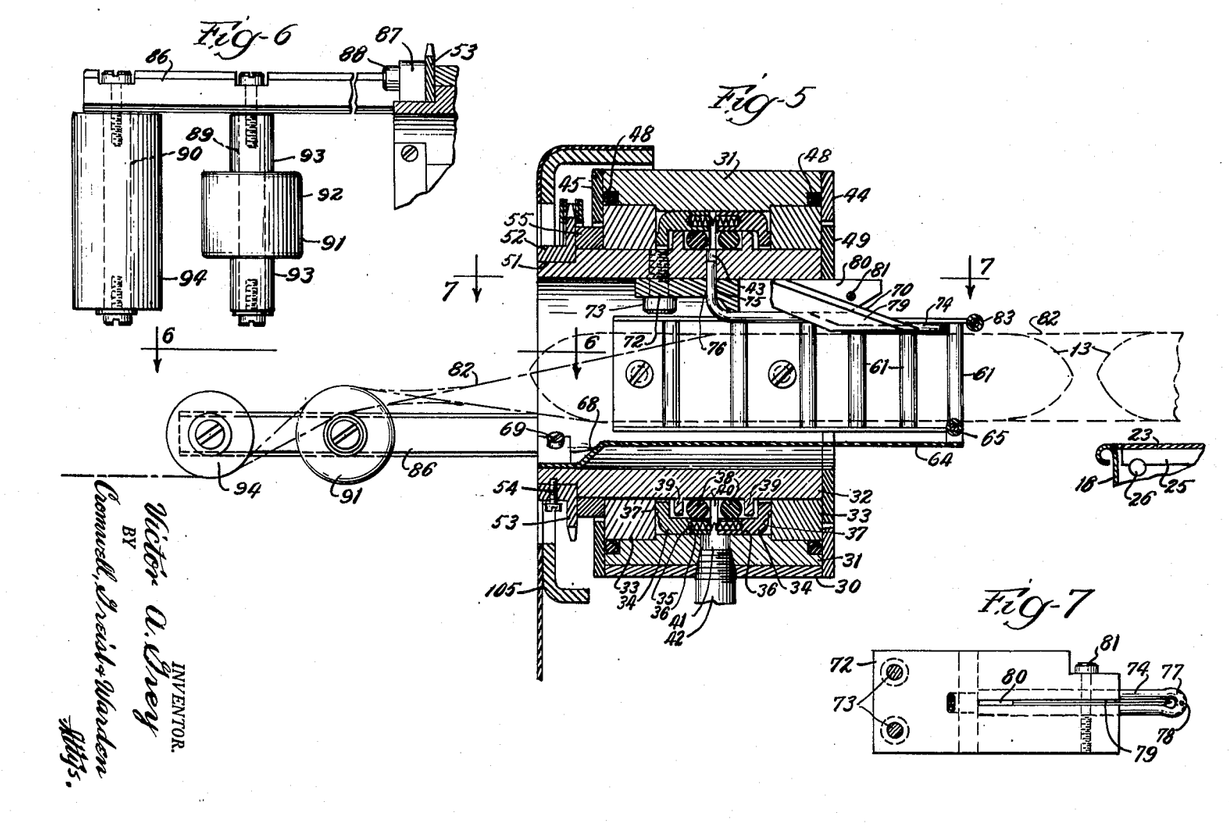
Fig. 5 is a sectional view, taken on the line 5—5 of Fig. 3.
Fig. 6 is a view taken on the line 6—6 of Fig. 5.
Fig. 7 is a detailed view taken generally on the line 7—7 of Fig. 5.

The outer head member 31 is provided on opposite faces or ends with cover plates 44 and 45 each of which is apertured to receive the rotatable inner members with the internal margins of the cover plates projecting over a portion of the end faces of each bearing ring 33. The cover plate 44 is secured to the head member 31 by means of a plurality of counter-sunk screws 46 while the cover plate 45 is secured to the opposite end of the head member 31 by counter-sunk screws 47.

Sealing gaskets 48 are arranged in recesses in the inner edges of the outer member 31 adjacent the outer edges of the bearing rings 33. The inner head member 32 is provided at the end adjacent the tank 18 with a cover plate 49 which is secured to the end of the member by counter-sunk screws 50 and which has an external diameter somewhat smaller than the internal diameter of the cover plate 44 on the outer head member 31 so that the outer margin thereof extends over and into engagement with the inner portion of the outer face of the bearing ring 33. The cover plate 49 is provided with a central aperture which is approximately the same diameter as the internal diameter of the inner head member. The inner head member 32 extends at the other end of the head beyond the outer end face of the outer member 31 through the central aperture provided in the face plate 45 which is of larger diameter than the external diameter of the inner member 32. The member 32 is recessed at its end edge to provide a groove 51 receiving therein the hub 52 of a driving sprocket 53 which is secured in fixed relation thereon by a set screw 54. A spacer washer 55 extends between the inner face of the sprocket 53 and the outer face of the bearing ring 33 on the inner member 32.

Sausage guide means is provided within the interior of the inner head member 32 which comprises oppositely disposed, elongate plates or bracket members 55 and 56 which are curved so that they are generally C-shaped in cross section and which carry between bearing flanges 57, 58 and 59, 60 formed along the marginal edges thereof a plurality of relatively small elongate rollers 61 and 62, which rollers are arranged in spaced relation axially of the head 14. The ends of the supporting brackets 55 and 56 extend outwardly or rearwardly of the face of the head 14 toward the tank 18 projecting above the sausage supporting shelf 23. The distance between the two oppositely disposed sets of rollers 61 and 62 is somewhat greater than the diameter of the sausages 13 which are being fed to the head. The rollers 61 and 62 function to hold the sausages in alignment and guide them through the head 14.

A relatively thin elongate resilient plate 64 (Fig. 5) extends axially of the head between the sets of rollers 61 and 62 and carries at its rear end adjacent the platform 23 a roller 65 supported in end bearing brackets 66 and 67 (Fig. 3) extending upwardly of the plate 64. Plate 64 is bent at the opposite end to provide an offset attaching portion 68 which is secured by screws 69 to the inner wall of the head member 32 adjacent the discharge end with the body of the plate 64 extending in the axial direction toward the sausage receiving end of the head and spaced from the inner wall thereof. Plate 64 and the end roller 65 provide a resilient support for guiding the sausages through the head and urge the sausages toward a casing separating and slitting device 70 which is mounted opposite the plate 64. A stop member 71 (Fig. 3) extends laterally of the plate 64 beneath the edge of adjacent bracket 55 and limits the movement of the roller 65 toward the casing slitting device 70.

The casing separating and slitting device 70 is mounted on a rectangular block 72 which is secured by screws 73 to the inner wall of the rotatable head member 32 in oppositely disposed relation to the resilient plate 64 and the roller 65. The block 72 carries on its inner face a plow member 74 (Figs. 5 and 7) which consists of a reversely bent hollow rod or tube having its inner ends 75 extending through an aperture 76 in the block 72 and secured in the aperture 43 in the head member 32 to place the same in communication with the air compartment 40. The head portion 77 of the plow, which is formed by the looped or bent end in the tube is provided at 78 with apertures to deliver a fan shaped stream of air outwardly thereof for loosening the casing from the sausage meat. A relatively thin knife blade or slitter member 79 extends upwardly between the two legs of the tube member and into a slot 80 in the supporting block 72, being secured in clamped relation by the clamping screw 81 at the end of the block. The apertured head 77 of the plow member 74 is adapted to be positioned between the sausages 13 and the casing 82 so that air supplied to the plow head 77 will be forced some distance from the head 77 and tend to loosen the casing 82 from the sausages 13 as they are moved along beneath the plow 74. The knife 79 slits the casing 70 as it is drawn against the edge thereof above the plow member 74. A roller 83 is supported on bearing formations 84, 85 (Fig. 3) on the ends of bracket members 55 and 56 which tends to hold the sausages 13 in proper relation on the plow 74 as they pass beneath the same while the resilient plate 64 and roller 65 mounted thereon tend to urge the sausages 13 against the plow 74, the movement of the plate 64 being limited by the stop 71.

An axially extending bar or bracket member 86 (Figs. 5 and 6) projects from the discharge end of the inner head member 32 and is secured by a connecting bracket 87 and screws 88 to the outer face of the sprocket 53. Bar member 86 supports laterally extending axially spaced inner and outer stub shafts 89 and 90, with the inner shaft 89 being spaced some distance from the end of the inner head member 32. The inner shaft 89 carries a guide roller 91, preferably formed of wood or similar material, having a center section 92 which is somewhat narrower than the length of the shaft 89 and end hub forming portions 93 of reduced diameter. The outer shaft 90 supports in freely revolving relation thereon a roller 94. As the casing 82 is pulled from the head 14 it is passed over the roller 91 and beneath the roller 94. The central portion 92 and the hub forming portions 93 of the roller 91 receive the casing in reversely draped relation thereover which assists in stripping the casing from the sausages 13 and freeing the latter completely therefrom.

The inner head member 32 is rotated or driven relative to the fixed outer member 31 by means of sprocket 53 which is connected by a chain 95 (Fig. 2) to a driven sprocket 96 which is mounted on the driven shaft 97 of a change speed device 98. The change speed device 98 is mounted within the cabinet 10 and the driven shaft thereof extends outwardly through an aperture provided in the side of the casing. The input shaft 99 for the change speed device 98 is connected in driving relation with the motor 100 by pulley 101 on the shaft 99, driving belt 102 and pulley 103 on the drive shaft of the motor 100. The sprocket 96 is connected to the shaft 97 through an electromagnetic clutch 104. The clutch 104 is electrically connected to control mechanism 17 which will be described and operates to automatically connect and disconnect the sprocket 96 in driving relation with the shaft 97, in response to operation of the control mechanism 17.

The electromagnetic clutch 104 may be of any type which can be operated to start or stop the rotation of the head 14 by connecting and disconnecting the drive therefor with the shaft 97. Preferably the clutch 104 is of the type in which cooperating clutch plate elements are provided having contacting faces which when the clutch is activated are held against relative rotation while when the clutch is de-activated they are free to rotate relative to each other. One of the clutch elements is keyed to the constantly rotating shaft 97 and is activated or energized by a stationary coil arranged in a fixed casing adjacent the same which is supplied with current from an electrical circuit controlled by a micro-switch forming part of the automatic control mechanism 17. The other or driven clutch element is rotatably mounted on the shaft and secured to the sprocket 96 which drives the chain 95. When the constantly rotating clutch pole piece is de-energized by cutting off the current to the coil the driven clutch element and the sprocket 96 attached thereto are free to stop rotating which allows the head member 32 to come to a stop. The operation of the clutch is automatic and substantially instantaneous resulting in relatively rapid starting and stopping of the rotation of the head member 32.

The sprockets 53 and 96 and the chain 95 are preferably covered by a cover plate 105 which is removably mounted on the cabinet 10 and which is suitably apertured at opposite ends to receive the end of the rotatable head member 32 and the extended outer end of the driven shaft 97.

Figure 8:
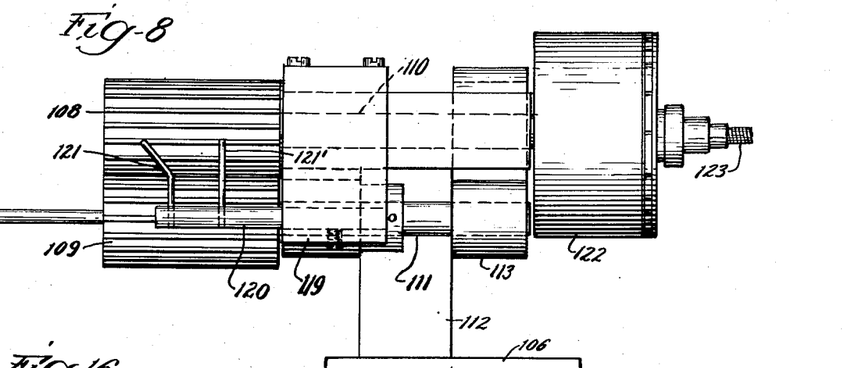
Fig. 8 is a detailed view, to an enlarged scale, taken generally on the line 8—8 of Fig. 1.

The casing feed or pull mechanism 15 is mounted on a supporting plate 106 (Figs. 1, 2 and 8) which is secured to the cabinet 10 by a suitable bracket 107 extending from the side face thereof at the discharge end of the skinning head 14. The pull mechanism 15 comprises a pair of cooperating rollers 108 and 109, supported on shafts 110 and 111, which rollers are provided with interengaging toothed or corrugated engaging surfaces. The shaft 110 is journaled in the upper end of an upstanding T-shaped bracket 112 having the top or head portion projecting at an angle and forwardly toward the skinning head 14. The shaft 111 which carries the roller 109 is rotatably mounted in the ends of the forwardly projecting legs of a cooperating U-shaped bracket 113 which straddles the stem of the bracket 112 and which is pivoted at 114 to the same. The bracket 113 carries at its pivoted end an angle bracket 115 and a tension spring 116 connects the same to the plate 106, thereby urging the roll 109 into cooperating driving engagement with the roll 108. A stop control switch 117 is provided at the outer end of the bracket 115 and an adjustable screw 118 is provided in the end of bracket 115 for operating the same so that when the rolls 108 and 109 are in engagement without the casing 82 being threaded between the same the power circuit is open and the machine is stopped and will not operate. When the rolls 108 and 109 are separated by the casing being fed between the same the stop switch 117 is operated to close the power circuit so that the machine is in condition for operation upon actuation of a starting switch. The fixed bracket 112 for supporting the roll 109 also carries at its free end a supporting angle plate 119 having an aperture extending transversely near the lower end thereof, in which there is removably mounted a bar or post 120. The bar 120 projects laterally and parallel to the axis of the shaft 111, and carries thereon in spaced relation a pair of upstanding outer and inner guide members 121 and 121' for receiving therebetween the casing 82, the outer member 121 having an outwardly bent upper end portion. The shaft 110 carrying the roller 108 is extended beyond the other side of the upstanding bracket 112 and is connected through an electromagnetic clutch device 122 with the end of a flexible shaft 123, the other end of the shaft 123 being connected in driving relation with the driven shaft 97 extending from the cabinet 10. The shaft 123 is normally rotating or in driving relation when the motor 100 is operating while the shaft 110 is connected thereto through the clutch 122 which is electrically connected to control mechanism 17. The clutch 122 is the same type as clutch 104 and is arranged so that the cooperating clutch elements or plates are arranged in reverse relation relative to the driving shaft. That is, the clutch element or pole piece which is energized by the fixed coil is keyed on shaft 110 while the other clutch plate member is fixed to a sleeve rotatably mounted on the end of shaft 110 which sleeve is connected to the end of the drive shaft 123 and rotates with the same. When the clutch is energized to hold the clutch plates in non-rotating relation to each other the shaft 110 is connected in driving relation with shaft 123. In this manner the clutch 122 is operated to connect or disconnect the shaft 110 with the drive shaft 123 in response to operation of the control mechanism 17.

Figures 2, 13, 14, 15:
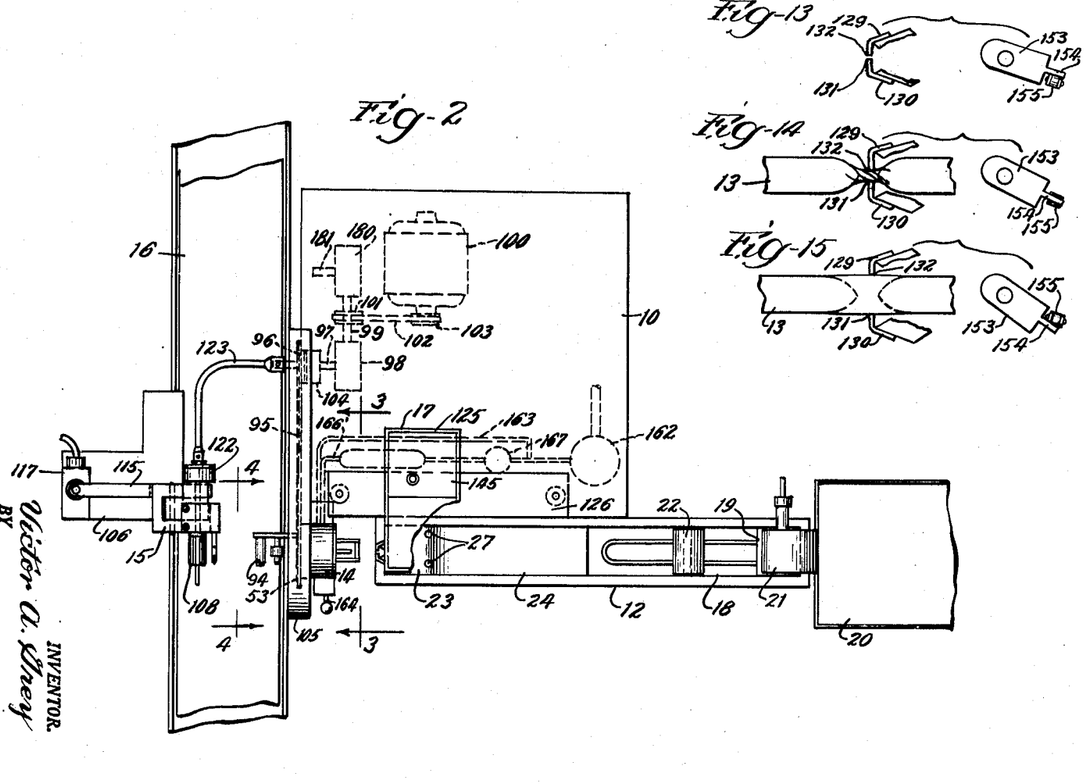
Fig. 2 is a plan view of the mechanism shown in Fig. 1, with portions broken away.
Figs. 13, 14 and 15 are schematic views illustrating the operation of the control fingers.

The control mechanism 17 which automatically controls the rotation of the casing skinning and separating head 14 and the casing pulling or feed mechanism 15 by the means of the electromagnetic clutches 104 and 122 comprises a box-like case or frame 125 (Figs. 1, 2, 9 and 10) which is secured to a supporting bar or plate member 126 mounted on the top of the cabinet 10 between the posts 127 and 128. The control mechanism 17 includes a pair of resiliently movable actuating or control fingers 129 and 130, which are formed from relatively thin elongated plates bent at an angle along their long axis to provide oppositely disposed edges 131 and 132 which are adapted to be positioned for engagement on opposite sides of the string of sausages 13 as illustrated in Figs. 13, 14 and 15. The control actuating fingers or plates 129 and 130 are secured in depending relation, with the opposed edges 131 and 132 parallel, on the ends of a pair of horizontal arms 133 and 134 (Fig. 9) which arms are pivotally connected at their opposite ends to shaft 135 and sleeve 136, respectively. Shaft 135 is mounted for relative rotation within the sleeve 136 and the sleeve 136 is rotatably mounted by means of bearings 137 and 138 in a vertical bore 139 in the outer end of a horizontal support bracket or arm 140, which projects downwardly through an elongate aperture 141' provided in the bottom member 141 of the frame 125. The support arm 140 is pivotally mounted at its other end on a vertical shaft 142 journaled in a bearing 143 in the bottom member 141 and a bearing sleeve 144 in a fixed portion of the top member 145 of the frame 125. The supporting arm 140 is swingable about the pivot 142 with the movement in one direction limited by a slotted adjustably mounted stop plate 146 secured by screw 147 in the bottom member 141 with the arm 140 urged toward the stop plate 146 by a tension spring 148 connected at opposite ends to the arm 140 and the vertical side wall of the frame 125. A top bearing is provided for the upper end of the shaft 135 which comprises an adjustable set screw 149 mounted in the overhanging end of an angle bracket 150 which is secured to one side of the free end portion of the supporting arm 140 by means of a set screw 151, the lower end of the set screw 149 engaging the top of a cap screw 152 which secures to the top of the shaft 135 a switch actuating plate 153 having an end finger 154 (Fig. 9) which is adapted to engage a roller switch button 155 projecting upwardly of a micro-switch 160 which is mounted on the vertical portion of a supporting angle bracket 161 attached to the top of the sleeve 136. The bearing sleeve 136 is held against downward vertical movement in the bore 139 by the bracket 161 engaging with the end of the bearing member 138 while upward movement is prevented by arm 134 which is secured on the sleeve 136 below the bearing 137. The shaft 135 is held in the sleeve 136 by the arm 133 secured on the lower end thereof below the end of sleeve 136 and the plate 153 which is spaced above the upper end of sleeve 136 by washer 156 and fastened to the shaft 135 by the cap screw 152. The switch operating finger 154 and the switch roller button 155 are so arranged that the roller 155 is in the path of movement of the finger 154 upon relative rotation of the shaft 135 and the sleeve 156. The fingers 129 and 130 are urged toward each other by a tension spring 157 connected at one end to the outer upper corner of the vertical portion of the angle bracket 161 and to the corner of the plate 153. When the fingers 129 and 130 are in the closed position as in Fig. 13 the switch actuating finger 154 is on the far side of the roller 155 as viewed in Fig. 9. Upon the fingers 129 and 130 moving towards an open position, the finger 154 engages the roller 155 and actuates the micro-switch 160. As the fingers 129 and 130 move to a wide open position, as in Fig. 15, the finger 154 passes over and beyond the switch roller 155 and allows the micro-switch to operate to actuate the driving clutch 122 and deactivate the clutch 104.

Figure 3:
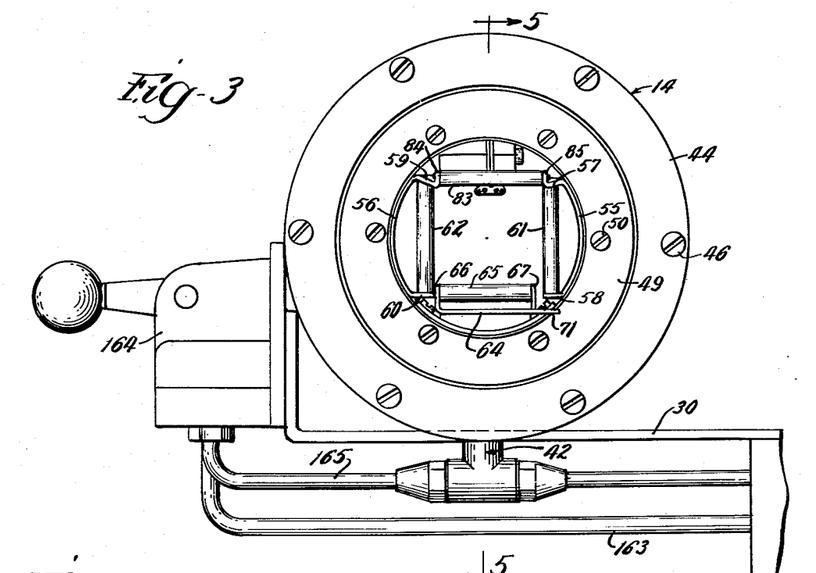
Fig. 3 is a view, to an enlarged scale, taken on the line 3—3 of Fig. 2 showing one end of the head which constitutes the skinning mechanism.
Figure 4:
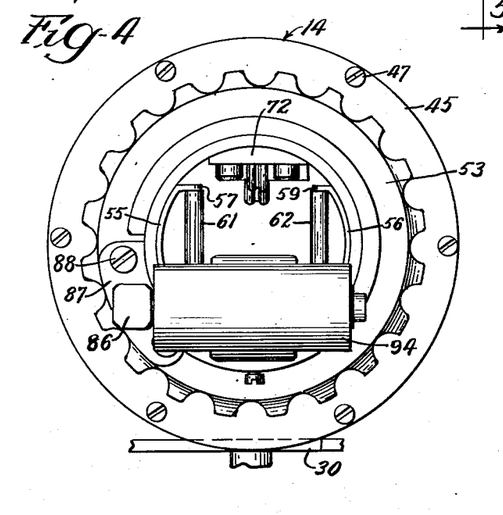
Fig. 4 is a view, to an enlarged scale, taken on the line 4—4 of Fig. 2, and showing the other end of the skinning mechanism.
Figure 17:
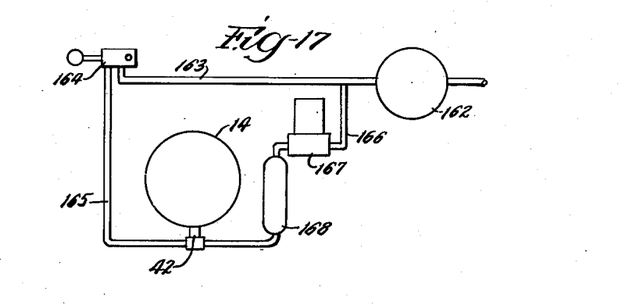
Fig. 17 is a schematic layout of the compressed air connections in the machine.

Air is delivered to the plow member 74 in the head 14 through suitable conduits and control devices as illustrated diagrammatically in Fig. 17. Air is supplied under suitable pressure, by a pump or other exterior source (not shown), to a combination regulator and filter device 162 (Figs. 2 and 17). It passes through a conduit 163 to a manually controlled valve 164 at the rotary head 14, and thence through the conduit 165 to the connection 42 and into the air passage 49 in the head 14 (Figs. 2 and 3). The air may also reach the connection 42 in the head 14 by a line 166 which connects the regulator 162 with the head 14 through a solenoid control valve 167 and an expansion chamber 168, the latter being provided to cushion the sudden application of the air to the head by the rapid opening of the solenoid control valve 167.

Figure 16:
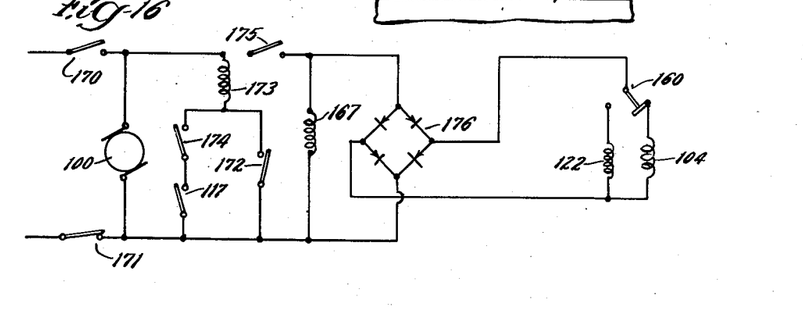
Fig. 16 is a schematic layout of the electrical connections in the machine.

The electric circuit is diagrammatically shown in Fig. 16. The main circuit is provided with a main switch 170 which, when closed, operates the motor 100 provided the stop switch 171 is closed. The stop switch 171 is placed on the machine in a position within easy reach of the operator for emergency stops. A starting switch or push button 172 is provided, also positioned on the machine within easy reach of the operator, which when closed actuates the relay 173 to close the remainder of the circuit provided the stop switch 117 (Fig. 1) is closed, the relay 173 closing the contacts 174 and 175 which actuates the solenoid 167 and turns on the air in the head 14. A rectifier 176 provides current for a secondary circuit which includes the control micro-switch 160 and the coils of the electromagnetic clutches 104 and 122.

Figure 9:
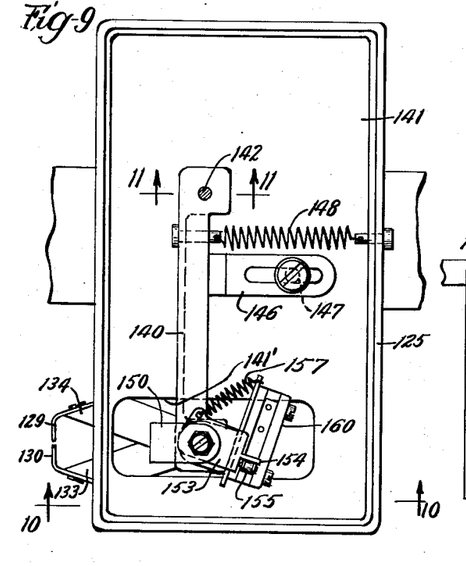
Fig. 9 is a section, to an enlarged scale, taken on the line 9—9 of Fig. 1.
Figure 10:
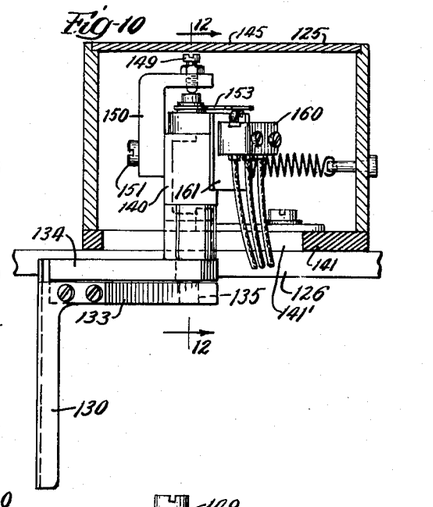
Fig. 10 is a section taken on the line 10—10 of Fig. 9.
Figure 11:
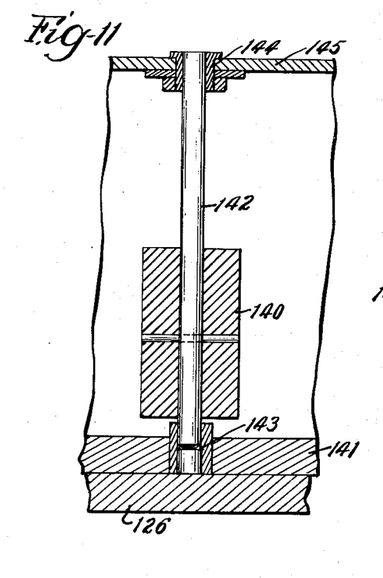
Fig. 11 is a section, to an enlarged scale, taken on the line 11—11 of Fig. 9.
Figure 12:
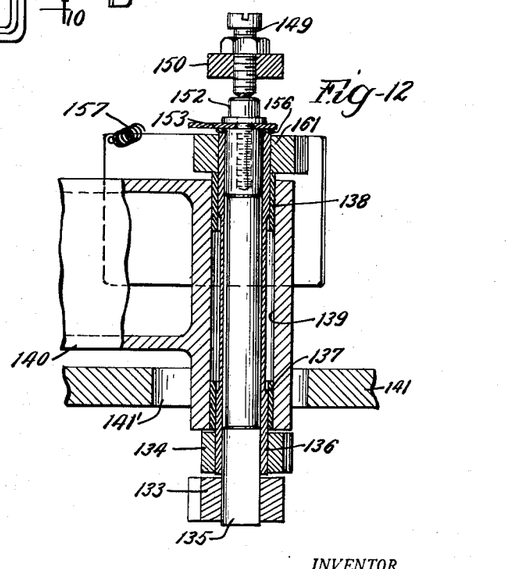
Fig. 12 is a section, to an enlarged scale, taken on the line 12—12 of Fig. 10.

In operating the mechanism the operator closes the main switch 170 to actuate the motor 100 and starts the shaft 97 into operation, the emergency stop micro-switch 171 being in a closed position. One end of a string of sausages which is positioned in the receptacle 20 is threaded over the guide plate 21 and beneath the roller 22 through the tank 18 and the heated liquid with which the tank is filled. The first sausages are fed between the guide posts 27 over the support plate 23 after the casing has been cut and opened at the leading end of the leading sausage and the leading sausage has been rotated to straighten the casing between it and the next succeeding sausage. The leading sausage 13 is fed through the head 14 with the end or head of the plow 74 being positioned between the casing and the sausage and with the hand valve 164 opened to supply air to the plow 74 to inflate the casing. A sufficient length of the casing, approximately two sausage lengths, is fed through the head to reach the pull rolls 108 and 109. The rolls 108 and 109 are moved apart by lifting upwardly on the bracket 115 against the pull of the spring 116 and the casing 82 is inserted between the same in position for pulling by the rolls. This allows the switch 117 to close and the machine may then be started for automatic operation by closing the starting switch 172, the manual air valve 164 having been closed, which sets the pull rolls 108 and 109 in operation and turns on the air through valve 167. Subsequent operations of the machine are controlled by the microswitch 160 which is actuated by movement of the fingers 129 and 130. As the fingers 129 and 130 move toward each other when a twisted section of casing between the individual sausages is moved between them in the pull rolls 108 and 109 are stopped and the head 14 is rotated by operation of the clutches 122 and 104, respectively. When the head 14 has rotated sufficiently to straighten the casing between the sausage in the head and the next succeeding sausage in the string the air supplied through the plow 74 by the solenoid operated valve 167 will inflate the casing, as shown in Fig. 15, and move the fingers 129 and 130 away from each other. This reverse movement of the fingers 129 and 130 operates the micro-switch 160 to change the operation of the head 14 and the pull rolls 108 and 109, stopping the head 14 almost instantaneously and simultaneously starting the pull rolls 108 and 109 to carry the sausage through the head. The fingers 129 and 130 are held in the separated position by the advancing movement of the next succeeding sausage until they reach the next twist which permits them to move toward each other and again actuate the micro-switch 160 to change the operation of the head 14 and the pull rolls 108 and 109, starting the rotation of the head 14 and stopping the rotation of the pull rolls 108 and 109. When the last sausage in the string has passed into the head 14 the fingers 129 and 130 move to the closed position which starts the pull rolls 108 and 109 and stops the rotation of the head 14. The pull rolls continue to operate with the head stopped until the last sausage and the trailing end of the casing 82 is removed from the head, the casing 82 passing between the rollers 108 and 109 and allowing the same to move into closed position and operate the switch 117 to stop the machine. The fingers 129 and 130 and the relative location of the switch roller 155 and operating finger 154 are so adjusted that when the fingers 129 and 130 are closed as shown in Fig. 9 the switch actuating finger 154 is on one side of the switch roller 155 in position to operate the same and actuate the switch 160 as the fingers 129 and 130 move to open position. In the open position which occurs upon inflation of the casing between the sausages and while the fingers are held open by the passage of a sausage the switch 160 actuates the clutch 122 to rotate the pull rolls 108 and 109 while the clutch 104 is de-activated and the head 14 does not rotate. As the pulling operation of the rolls 108 and 109 draws a sausage into the head and the fingers 129 and 130 fall into the space between it and the next sausage where there is a twisted section of casing (Fig. 14) the movement of the fingers causes the switch operating finger 154 to move onto the roller 155 and actuate the clutch 104 to rotate the head 14 until the twist is removed and the untwisted casing section is inflated between the sausages which causes the fingers 129 and 130 to move towards the open position (Fig. 15) with the finger 154 moving to the other side of switch roller 155 and actuates the switch 160 to de-activate the clutch 104 and stop the rotation of the head while at the same time it activates the clutch 122 and starts the rotation of the pull rollers 108 and 109. When the last sausage in the string passes between the fingers 129 and 130 they move toward each other to the closed position (Fig. 13) and the switch activating finger 154 moves across the switch button 155 to the other side thereof which causes the pull rolls to continue operating but does not rotate the head 14. This permits the last sausage and the end of the casing to clear the machine. The arm 140 being pivoted about the post 142 permits the fingers 129 and 130 to move a limited distance in the forward direction toward the head 14 as they are carried forward by the advancing sausage which follows the twist in the casing into which the fingers have dropped as illustrated in Fig. 14. Immediately upon inflation of the casing as illustrated in Fig. 15 the fingers 129 and 130 are separated sufficiently to permit the spring 148 to pull the arm 140 backward to move the fingers into a normal position in spaced relation to the receiving end of the head 14 as shown in Fig. 2. The position of the fingers 129 and 130 relative to the receiving end of the head 14 may be adjusted by movement of the stop block 146 in the frame 125 so that they are not pulled forward a sufficient distance to strike the head 14 when they move up towards the head 14 in engagement with the twisted section of the casing 82. The switch actuating plate 153 may be adjusted on the shaft 135 by loosening the cap screw 152 to properly time the opening and closing movement of the switch roller 155 so that the electromagnetic clutches 104 and 122 will be properly operated to rotate in properly timed relation the head 14 and the rollers 108 and 109. Since the operation of the casing pulling mechanism and the untwisting of the casing is controlled by the fingers 129 and 130 any non-uniformity in the twist between the sausage is automatically taken care of. If the casing between a sausage and the next succeeding sausage has become untwisted and is straightened as it approches the head 14 it is immediately inflated with the air and the fingers 129 and 130 which have been held in the open position by the passage of the sausage will remain in the open position for passage of the next succeeding sausage which results in the pull rolls 108 and 109 continuing to operate while the head 14 will not be rotated until the fingers 129 and 130 have dropped into the next space provided between the sausage where the twists occur. If there are more twists or less twists than the usual number the operation of the head 14 to remove the twist is stopped or continued as required since the fingers 129 and 130 are actuated or moved apart by inflation of the casing which occurs when the twists are removed therefrom or it is straightened, regardless of how many twists are in the casing section as it moves up to the head where the air can reach the connecting section.

The mechanism may be timed so that the rotation of the pull rollers and consequent advancing movement of the sausages is very nearly continuous since the fingers 129 and 130 are mounted so that they will move forward at limited distance with the sausage when the fingers drop into the space where the twist occurs, which forward movement is sufficient to permit the head to rotate the advancing sausage the required number of turns to untwist the casing simultaneously with the forward movement of the same, the casing being inflated when untwisted and the fingers being separated thereby which permit them to be moved rearwardly by the spring 148 until they drop into the next space and the operation is repeated. The mechanism is operated at a relatively high rate of speed and the untwisting and advancing movements may overlap or occur simultaneously.

While the mechanism has been shown (Fig. 2) as embodying a single head 14 and accompanying elements for operating on a single string of sausages at one time, operation on multiple strings of the sausages may be provided for by mounting the necessary duplicate mechanisms on the cabinet 10, it being possible to provide duplicate heads 14 and accompanying mechanism at either side of the top of the cabinet 10 with a plurality of the mechanisms being operated from a single source of power. In Fig. 2 a speed change device 180 is indicated which may be connected in tandem with the speed change device 98 and driven from the motor 100, to provide a constantly rotating power shaft 181 for connection with a duplicate skinning head and cooperating casing pulling mechanism at either side of the machine, with automatic control mechanism provided for each head. A number of the skinning devices may be thus arranged within easy reach and control of a single operator so that while the one string of sausages is being operated on by one set of skinning and pulling devices another string can be threaded through and started in operation on another set of skinning and pulling devices.

While specific details of construction and particular materials have been referred to in describing the illustrated form of the invention it will be understood that other details of construction and other materials may be resorted to within the spirit of the invention.

I claim:

1. A mechanism for removing the casing from a length of connected link sausages which sausages are characterized by a twist in the casing between the respective sausages, said mechanism comprising means for supporting the casing with the leading end thereof in substantially extended relation, means adjacent said casing supporting means for guiding the connected encased sausages in a predetermined path, a casing removing device mounted along said path and having means for gripping each individual sausage and for rotating the same relative to the succeeding sausage to untwist the casing between the sausages, means arranged in said casing removing device for loosening and slitting the casing, means associated with said casing removing device for separating the casing from the sausages, means adjacent said casing separating means for engaging the casing as it leaves said casing separating means and for exerting a pull thereon, and automatic control means associated with said casing removing device and said casing engaging means, said control means being operative in response to movement of the sausage to start and stop the operation of said casing engaging means and to start and stop the rotation of said casing gripping means whereby each sausage is rotated relative to the succeeding sausage to untwist the casing between the same and thereafter the casing is removed therefrom.

2. A mechanism for removing the casing from a length of connected link sausages which sausages are characterized by a twist in the casing between the respective links, said mechanism comprising means for supporting the leading portion of a length of the casing in substantially extended relation, means adjacent said supporting means for guiding the connected and encased sausages in a predetermined path, means adjacent said guiding means for gripping each individual sausage successively and for rotating the same relative to the succeeding sausage to untwist the casing between the sausages, means arranged adjacent said gripping and rotating means for loosening and slitting the casing, means arranged adjacent said loosening and slitting means for separating the casing from the sausages, means arranged adjacent said casing separating means for engaging the separated casing and for exerting a pull thereon, operating mechanism connected with said gripping and rotating means and with said separated casing engaging means, and means for actuating said operating mechanism in accordance with the rotative and axial movement of the sausages.

3. In a machine for removing the casing from a plurality of sausages which are connected by twisted portions of the casing, a hollow rotatably mounted head having means associated therewith for slitting the casing longitudinally as the sausages advance therethrough, means spaced from said slitting means in the direction of advancing movement of the sausages for advancing the slit casing and thereby moving successive sausages through the head, means for rotating the head to untwist the casing portions between the sausages in the head and the next succeeding sausages, means for operating the casing advancing means, and control means for said head rotating means and said operating means actuated by the increase in diameter of the connecting portions of the casing which occurs when said portions are untwisted, to stop the rotation of the head and to start the operation of the casing advancing means, said control means being also actuated by the connecting portions of the casing when said portions are in twisted condition to stop the casing advancing means and to start the rotation of the head.

4. A mechanism for removing the casing from a string of sausages which are encased in a tubular casing and are separated from each other by contracted but distensible intervening sections of the casing, said mechanism including means for progressively slitting the casing, power operated means adjacent said casing slitting means for progressively withdrawing the slit casing, and control means associated with said power operated means and actuated by the section of the casing at the rear end of the leading sausage when said casing is contracted said power operated means inoperative and for starting said power operated means in response to the distention of said section from its contracted condition.

5. A hollow open-ended rotatable head through which a string of linked sausages are adapted to travel, means mounted in the head for cutting the casings on the sausages longitudinally as they move through the head, rotatable means associated with said head for withdrawing the cut casings as they are cut, means connected to said head for rotating the head to untwist the portion of the casing which connects the sausage in the head with the next sausage, means connected with said casing withdrawing means for rotating the casing withdrawing means, and control means connected with said head rotating means and with the rotating means for said casing withdrawing means for selectively actuating the same, said control means having movable fingers mounted in position for engaging the sausages, said fingers being operative when moved away from the sausages, by the increase in size of said connecting portion of the casing which occurs when said portion is untwisted, to stop the rotation of the head and to start the operation of the withdrawing means, said fingers acting automatically when moved in a direction toward the sausages by engagement with a twisted connecting portion of the casing to stop the rotation of the withdrawing means and to start the rotation of the head.

6. A sausage skinning machine comprising a hollow open-ended rotatable head, means associated with said head for axially guiding a string of linked sausages through the head, means associated with the head for cutting the casings on the sausages longitudinally as they move therethrough, means adjacent said head for withdrawing the cut casings from the head, drive means connected to the head for rotating the head to untwist the portion of the casing which connects the sausage in the head with the next succeeding sausage, drive means connected to the casing withdrawing means for operating the casing withdrawing means, and control means connected with the drive means for rotating the head and for operating the casing withdrawing means, said control means having an actuator which is operated by the increase in size of said connecting portion of the casing which occurs when it is untwisted, to stop the rotation of the head when said casing portion has been untwisted and to start the operation of the withdrawing means, said control means also being operated automatically to thereafter stop the operation of the withdrawing means as soon as a twisted connecting casing portion has been drawn into a predetermined position relative to the head and to start the rotation of the head.

7. A hollow open-ended rotatable head through which a string of linked sausages are adapted to travel, means on the head for cutting the casings on the sausages longitudinally as they move through the head, means associated with the head for inflating the casing in advance of the slitting means, means associated with the head for withdrawing the cut casings as they are cut, means connected to the head for rotating the head to untwist the portion of the casing which connects the sausage in the head with the next sausage, means connected to the casing withdrawing means for operating the casing withdrawing means, and control means connected with said head rotating means and with the operating means for said casing withdrawing means, said control means adjacent said head having elements mounted in position for resiliently engaging on opposite sides of the string of sausages, said control means being actuated when said elements are moved apart by the increase in size of an untwisted and inflated portion of the casing, to stop the rotation of the head and start the operation of the withdrawing means, said control means being actuated, when said elements are moved toward each other by engagement with a connecting portion of the casing which is in twisted condition as it approaches the head to stop the operation of the withdrawing means and to start the rotation of the head.

8. A machine for removing the casing from a string of link sausages which are characterized by a twisted casing section between each sausage and the adjoining sausages, comprising a hollow open-ended rotatable head through which the sausages are adapted to travel, means associated with the head for cutting the casings on the sausages longitudinally as they move through the head, means adjacent said head for withdrawing the cut casings as they are cut, means connected to the head for rotating the head to straighten the portion of the casing which connects a sausage moving into the head with the next sausage, means connected with said casing withdrawing means for operating the casing withdrawing means, and control means connected with said head rotating means and with the operating means for said casing withdrawing means, said control means being actuated by the increase in size of said connecting portion of the casing which occurs at is is straightened, to stop the rotation of the head as said casing portion is straightened and start the operation of the withdrawing means, said control means also acting automatically to stop the operation of the withdrawing means as the next sausage having a twisted casing section between it and the succeeding sausage is drawn into operative position in the head and to start the rotation of the head.

9. A machine for removing the casing from a plurality of connected sausages, which sausages are characterized by being formed with a twisted section of casing separating the individual sausages and with the twisting being in the same direction comprising a hollow rotatably mounted mechanism having means associated therewith for slitting the casing as the sausages move therethrough, means for inflating the casing to loosen the same in advance of the slitting means, and resilient means for gripping the sausages and guiding them therethrough, mechanism adjacent said first mentioned mechanism for gripping the slit casing and exerting a pull thereon to move the successive sausages through said first mentioned mechanism, operating means connected with both said mechanisms, and control mechanism connected with said operating means, which control mechanism comprises means positioned for engagement with the sausages and responsive to movements thereof, to actuate said operating means for rotating said first mentioned mechanism and for operating said second mentioned mechanism whereby each successive sausage is moved into said first mentioned mechanism and rotated to remove the twist in the casing between it and the next succeeding sausage and the casing is moved by said second mentioned mechanism through said first mentioned mechanism and the next succeeding sausage is moved into the same for rotation thereby.

10. In a machine for removing the casing from a string of conected sausages which are characterized by a twist in the casing between the individual sausages, a casing slitting and removing mechanism comprising a stationary outer ring member, an inner ring member rotatably mounted therein, means connected to said inner ring members to rotate said inner ring member, a casing loosening and slitting device having a portion secured within one end of said inner ring member, guide means associated with said device for engaging successive sausages and guiding the same relative to said device whereby the casing is loosened and slit upon movement thereof through said inner ring member, a casing separating means extending beyond the other end of said inner ring member, a separated casing pull means positioned adjacent said casing separating means, power means connected to said separated casing pull means for controlling the operation of said separated casing pull means, electromagnetic control mechanism connected to the means to rotate the inner ring member and to the power means for said separated casing pull means, and means connected to said electromagnetic control mechanism for actuating the same including a device which is movable in response to advancing movement of the sausages and also to the untwisting of individual sausages, whereby each sausage in the string is rotated to remove the twist in the casing between it and the next succeeding sausage and thereafter is moved by the separated casing pull means through the inner ring member.

11. A machine for removing the casing from a length of connected link sausages which sausages are characterized by a twist in the casing portions connecting the respective sausages, said machine comprising means for guiding the connected and encased sausages in a predetermined path, rotatable means adjacent said guiding means for resiliently gripping each successive sausage, a power drive shaft, clutch means connecting said gripping means to said power shaft whereby to rotate the same and untwist the portion of the casing between the sausage engaged thereby and the next succeeding sausage, means associated with said gripping means for loosening and slitting the casing as the sausages move along said gripping means, means arranged adjacent said loosening and slitting means for separating the casing from the sausages after it is slit, rotatable means arranged adjacent said sausage gripping means for engaging the separated casing and exerting a pull thereon whereby to advance successive sausages to said gripping means, clutch means connecting said casing engaging means to said drive shaft and an automatic control mechanism connected to said clutch means for selectively operating said clutch means, and means associated with said control mechanism for actuating the same when there is a twist in the connecting portion of the casing between the sausage engaged by said gripping means and the next succeeding sausage to operate the clutch connecting the gripping means to the drive shaft and for actuating said control mechanism when there is no twist in the connecting portion of the casing between the sausage engaged by said gripping means and the next succeeding sausage to operate the clutch connecting the casing engaging means to the drive shaft.

12. In a machine for removing the casing from a plurality of sausages which are connected by twisted portions of the casing, a hollow rotatably mounted head through which the sausages are moved, said head having means connected therewith for slitting the casing longitudinally as the sausages move therethrough, cooperating feed rollers arranged in spaced relation to said slitting means in the direction of advancing movement of the sausages for engaging the slit casing and advancing the same to thereby move successive sausages through the head, a drive shaft, clutch means connecting the head to said drive shaft for rotating the head to untwist the casing portion between the sausage in the head and the next succeeding sausage, clutch means connecting the feed rollers to said drive shaft for rotating the same, and automatic control means connected to said clutch means for selectively operating the same, said control means being activated by the increase in diameter of the connecting portions of the casing which occurs when said portions are untwisted, to stop the rotation of the head and to start the rotation of the casing feed rollers, said control means being also actuated by the connecting portions of the casing when said portions are in twisted condition to stop the casing feed rollers and to start the rotation of the head.

13. In a machine for removing the casing from a plurality of sausages which are connected by twisted portions of the casing, a hollow rotatably mounted head having means connected therewith for slitting the casing longitudinally as the sausages advance therethrough, casing feed rollers arranged in spaced relation to said slitting means in the direction of advancing movement of the sausages for engaging and advancing the slit casing and thereby moving successive sausages through the head, a power drive shaft, clutch means connecting the head with the power drive shaft for rotating the head to untwist the casing portion between the sausage in the head and the next succeeding sausage, clutch means connecting the casing feed rollers with the power drive shaft, a switch selectively controlling the operation of said clutch means, a pair of control fingers associated with said switch, said fingers being pivotally connected and movable toward and from each other to operate said switch, said control fingers engaging on opposite sides of the sausages and being movable away from each other upon engagement with connecting portion of the casing when said portion is untwisted and expanded, to stop the rotation of the head and to start the rotation of the casing feed rollers, said control fingers being also movable toward each other upon engagement with a twisted connecting portion of the casing to stop the rotation of the casing feed rollers and to start the rotation of the head.

14. A machine for removing the casing from a length of connected link sausages which sausages are characterized by a twist in the casing portions connecting the respective sausages, said machine comprising means for guiding the connected and encased sausages in a predetermined path, rotatably mounted means along said path and adjacent said guiding means for resiliently gripping each successive sausage, a power drive shaft, electromagnetic clutch means connecting said gripping means to said drive shaft to rotate the same and untwist the portion of the casing between the sausage engaged thereby and the next succeeding sausage, means associated with said gripping means for loosening and slitting the casing as the sausages move along said gripping means, means arranged adjacent said loosening and slitting means for separating the casing from the sausages after it is slit, means arranged adjacent said sausage gripping means for engaging the separated casing and exerting a pull thereon whereby to advance successive sausages to said gripping means, electromagnetic clutch means connecting said casing engaging means with said drive shaft, and an automatic control mechanism for selectively operating said electromagnetic clutch means, said control mechanism comprising a pair of oppositely disposed pivotally connected casing engaging elements mounted adjacent said gripping means, a switch electrically connected to said electromagnetic clutch means and mounted on one of said elements, a switch actuating finger on the other one of said elements, said switch being operated by said finger upon predetermined movement of said elements toward and from each other and said elements being moved toward and from each other upon passage of the sausages to said gripping means and engagement with the connecting portion of the casing between the sausage which is engaged by said gripping means and the next succeeding sausage.

15. In a machine for removing the casing from a plurality of sausages which are connected by twisted portions of the casing, a hollow rotatably mounted head having means associated therewith for slitting the casing longitudinally as the sausages advance therethrough, means mounted in spaced relation to said slitting means in the direction of advancing movement of the sausages for advancing the slit casing and thereby moving successive sausages through the head, means connected to the head for rotating the same to untwist the casing portions between the sausages in the head and the next succeeding sausages, means connected to the casing advancing means for operating the same, and control means associated with said head rotating means and the operating means for said casing advancing means, which control means is actuated by the increase in diameter of the connecting portions of the casing which occurs when said portions are untwisted, to stop the rotation of the head and to start the operation of the casing advancing means, said control means being also actuated by twisted connecting portions of the casing to stop the casing advancing means and to start the rotation of the head.

16. A mechanism for removing the casing from a length of connected link sausages which sausages are characterized by a constricted casing section separating the respective links, said mechanism comprising means for guiding the connected and encased sausages in a predetermined path, means adjacent said guiding means for engaging each individual sausage and for orienting the same relative to the succeeding sausage to straighten the casing between the same, means associated with said sausage engaging means for loosening and slitting the casing, means arranged adjacent said sausage contacting means for engaging the slit casing and exerting a pull thereon whereby to advance successive sausages to said engaging means, and an automatic control mechanism associated with said slit casing pulling means which is responsive to straightening movement of the constricted casing sections to operate the slit casing pulling means.

17. In a machine for removing the casing from a string of link sausages which are characterized by constricted casing sections separating the sausages in the casing, means for slitting the casing longitudinally, means associated with said casing slitting means for advancing the casing past the slitting means, means associated with said casing slitting means for straightening the constricted casing sections between the sausages and for enlarging the same, and automatic control means associated with said casing advancing means for starting and stopping the casing advancing means, said control means being actuated by the straightening and enlargement of the constricted casing section between a sausage advanced to said slitting means and the next succeeding sausage in the casing.

18. A machine for removing the casing from a plurality of sausages which are connected by constricted sections of the casing, said machine comprising means for inflating and straightening the casing and for slitting the same longitudinally, power operated means associated with said first mentioned means for advancing the casing to said first mentioned means, and control means associated with said power operated means for starting and stopping said power operated means, said control means being actuated by the straightening and inflating of the connecting casing section between a sausage advanced to said first mentioned means and the next succeeding sausage.

19. A mechanism for removing the casing from a plurality of serially connected links into which a stuffed casing has been divided, which links are separated from each other by contracted but distensible intervening sections of the casing, said mechanism including means for progressively slitting the casing, power operated means adjacent said casing slitting means for progressively withdrawing the slit casing, and control means associated with said power operated means and actuated in accordance with the contracted or distended condition of the section of casing at the trailing end of the leading sausage for stopping and starting said power operated means.

20. A mechanism for removing the casing from a plurality of serially connected links into which a stuffed casing has been divided, which links are characterized by a twist in the casing between the respective links, said mechanism comprising a rotatable frame having means for resiliently gripping the individual links as they are advanced thereto, means associated with said link gripping means for inflating and slitting the casing, rotatable means for engaging the casing as it leaves said inflating and slitting means and for exerting a pull thereon to advance the links relative to said rotatable frame, power means for rotating said frame, power means for rotating said casing engaging means, and automatic control means for selectively operating the power means for said frame and for said casing engaging means, said control means comprising a pair of pivotally connected fingers arranged on opposite sides of the links and engaging the links as they advance toward said gripping means, said fingers being pivotally mounted on a supporting arm member which arm member is pivotally supported adjacent said gripping means, resilient means for urging said fingers towards each other and into engaging relation with the links, resilient means for urging said supporting arm member in a direction to move said fingers along the links and away from said link gripping means and permitting movement of said fingers for a predetermined distance toward said link gripping means, and means actuated by pivoted movement of said fingers to connect and disconnect the power means with said rotatable frame and said casing engaging means whereby the successive links are rotated and the casing is removed therefrom in response to movement of the links.

References Cited in the file of this patent

UNITED STATES PATENTS

| Number | Name | Date |
|---|---|---|
| 2,340,755 | Jacobson | Feb. 1, 1944 |
| 2,630,598 | Grey | Mar. 10, 1953 |